UNITED STATES PATENT OFFICE 2,335,703

PREPARATION OF DISODIUM DIBROMHYDROXIMERCURIFLUORESCEIN

Theo Schwarz, Mexico City, Mexico, assignor to Industrias Proquifa, S. A., Mexico City, Republic of Mexico No Drawing. Application May 1, 1941, Serial No. 391,434. In Mexico March 19, 1941

3 Claims. (Cl. 260—335)

This invention relates generally to methods of preparing germicidal and disinfectant compositions, and more particularly is concerned with a novel process for the preparation of the disodium salt of 2:7 dibrom-4-hydroxymercurifluorescein. The process according to this invention may be conducted in neutral or alkaline mediums, and is based on chemical reaction between the two following salts: the disodium salt of 2:4:5:7-tetrabromfluorescein and the disodium salt of 2:7 dihydroxymercurifluorescein.

The alkaline medium in which the reaction between the two above named salts is conducted and which causes the formation of quinoid rings, facilitates the migration of the bromine atoms of the tetrabromfluorescein to the hydroxymercurifluorescein and the migration of the hydroxymercury radicals of the latter to the nucleus of the former. The result of this interchange of bromine atoms and oxymercury radicals is the final product.

According to the present invention the process for the preparation of the indicated substance is conducted as follows:

(1) To obtain the disodium salt of the fluorescein, the normally acidic fluorescein is neutralized with an aqueous solution of sodium hydroxide, keeping the hydrogen ion concentration slightly on the alkaline side, that is, at a pH of slightly more than 7. The solution thus obtained, having a known concentration of the disodium salt of fluorescein, is poured into an autoclave provided with a heating and agitating means, and mercuric oxide suspended in water is added in quantity equivalent to the disodium salt of fluorescein. Heat and vigorous agitation are applied to the materials while within autoclave for the time necessary to allow the mercuric oxide to enter into the fluorescein nucleus.

The reactions involved in these processes are as follows:

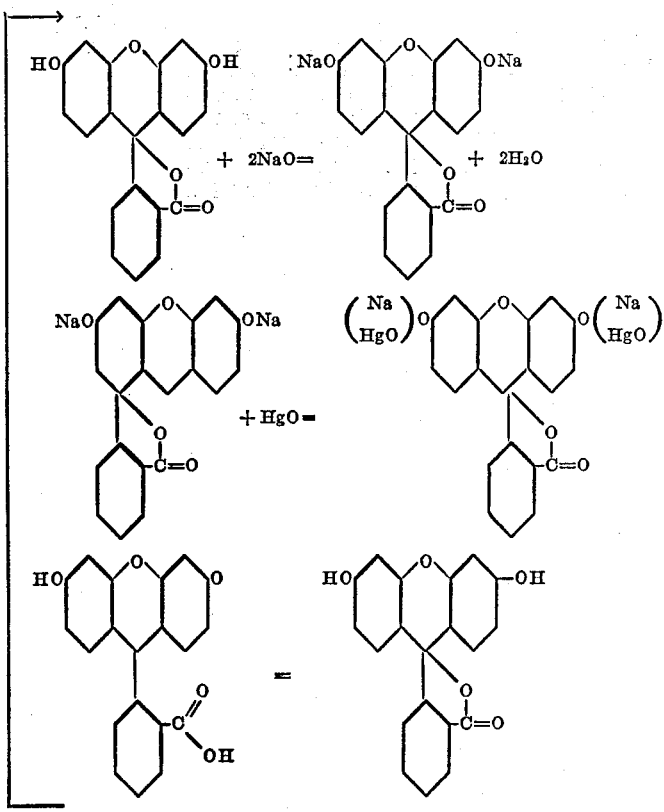

(2) To an alcoholic solution of tetrabromfluorescein sufficient solution of sodium hydroxide is added for complete neutralization thereby yielding the disodium tetrabromfluorescein. The reaction takes place at a temperature near the boiling point of alcohol, that is, at about 78° C. On cooling the solution so obtained, the crystals of the disodium salt of tetrabromfluorescein separate from the alcoholic solution which after draining, are dissolved in distilled water.

The reactions involved are as follows:

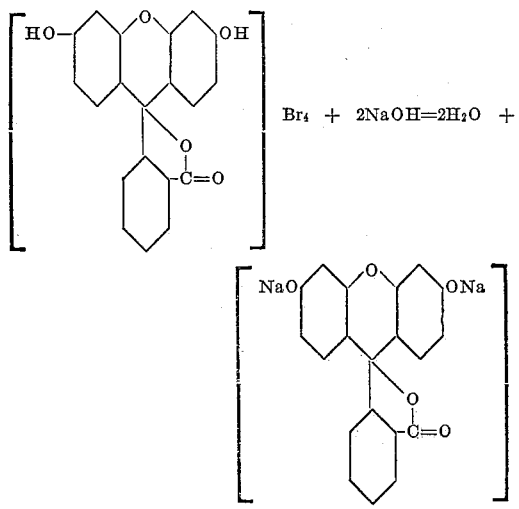

(3) The next and final step is to make an equimolecular mixture of the two described products, in other words; to each mol of the disodium salt of the tetrabromfluorescein is added a mol of the disodium salt of dihydroxymercurifluorescein. The solution thus obtained is heated under conditions capable of promoting the transfer of 2 bromine atoms from the disodium salt of tetrabromfluorescein to the disodium salt of dihydroxymercurifluorescein and 1 hydroxymercury radical to the other salt. Upon evaporating the solution to dryness, the resulting crystals are the disodium salt of the 2:7 dibrom-4-hydroxymercurifluorescein, which is a germicidal, disinfectant organomercury compound free of mercury in ionised state.

The reactions involved are as follows:

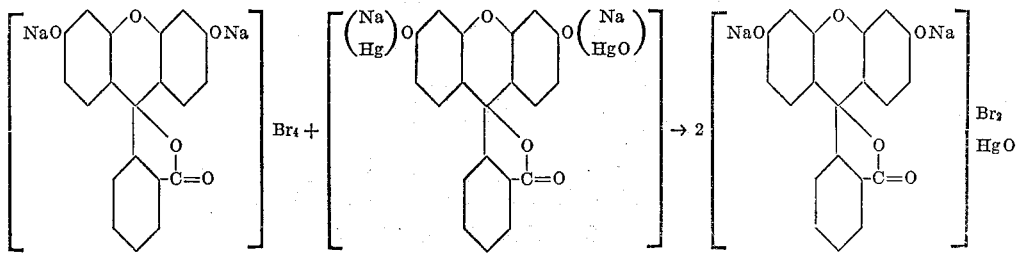

By practicing the process according to the present invention as above disclosed, a product is obtained which possesses satisfactory germicidal and disinfectant properties and which is incapable of yielding ionized mercury because of the insolubility of mercury in the presence of free hydroxyl groups.

Having thus described the invention, what I consider as new and desire to secure by Letters Patent is:

1. Process for preparing germicidal organomercury compounds that comprises condensing substantially equimolecular proportions of the disodium salts of tetrabromfluorescein and dihydroxymercurifluorescein.

2. Process for preparing germicidal organomercury compounds that comprises condensing substantially equimolecular proportions of the disodium salts of tetrabromfluorescein and dihydroxymercurifluorescein by heating a mixture of solutions of said disodium salts.

3. The process set forth in claim 2, wherein the heating is continued until the condensation product is crystallized from the mixture of solutions.

THEO SCHWARZ.